(12) United States Patent  
Chawathe et al.

(10) Patent No.: US 8,782,023 B1  
(45) Date of Patent: Jul. 15, 2014

(54) VERSIONED DATABASE CACHE

(75) Inventors: Monica Chawathe, Mountain View, CA (US); Namit Sikka, Sunnyvale, CA (US); Ashish Gupta, Sunnyvale, CA (US); Robert C. Keller, Palo Alto, CA (US); Fenglin Liao, San Francisco, CA (US); Haifeng Jiang, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 85 days.

(21) Appl. No.: 13/359,278

(22) Filed: Jan. 26, 2012

(51) Int. Cl.  
*G06F 17/30* (2006.01)

(52) U.S. Cl.  
USPC .......................................... 707/694; 707/695

(58) Field of Classification Search  
USPC .......................................... 707/638, 694, 695  
See application file for complete search history.

(56) References Cited

U.S. PATENT DOCUMENTS

2004/0186684 A1* 9/2004 Haft et al. ..................... 702/179  
2011/0313848 A1* 12/2011 Vaidyanathan et al. ... 705/14.43  
2012/0290714 A1* 11/2012 Cohen .......................... 709/224

* cited by examiner

*Primary Examiner* — Baoquoc N To  
(74) *Attorney, Agent, or Firm* — Harrity & Harrity, LLP

(57) ABSTRACT

A device may store information associated with a group of items in a database. The information associated with a particular item may include a group of versions of a particular attribute. A particular version of the particular attribute may include a value associated with the particular attribute and a timestamp. The device may receive a query that specifies a time; determine that the query is associated with the particular item; and determine, based on the specified time, which version of the particular attribute is associated with the query. The device may determine which version of the particular attribute is associated with the query by identifying, based on the timestamps associated with the versions of the particular attribute, a version of the particular attribute that is a newest version, of the versions of the particular attribute that are associated with timestamps that are before or concurrent with the specified time.

24 Claims, 14 Drawing Sheets

VERSIONED DATABASE CACHE

BACKGROUND

Databases may be used to store information, and can be queried in order to retrieve the stored information. Information stored by a database may change over time. For instance, a database that stores information regarding Internet advertisements may continuously be updated to reflect advertising-related events that occur, such as clicks on an advertising link, impressions of an advertising link, changes to an advertising link, etc.

SUMMARY

According to one possible implementation, a device may be configured to store information associated with a group of items in a database. The information associated with a particular item of the group of items may include a group of versions of a particular attribute associated with the particular item. A particular version of the plurality of versions of the particular attribute may include a value associated with the particular attribute, and a timestamp associated with the particular version. The device may further be configured to receive a query that specifies a time; determine that the received query is associated with the particular item; and determine, based on the specified time, which version of the particular attribute, stored in the database, is associated with the received query. The device may be configured to determine which version of the particular attribute is associated with the received query by identifying, based on the timestamps associated with the group of versions of the particular attribute, a version of the particular attribute that is a newest version from a set of the versions of the particular attribute that are associated with timestamps that are before or concurrent with the specified time. The device may further be configured to output the version of the particular attribute that is associated with the received query.

BRIEF DESCRIPTION OF THE DRAWINGS

The accompanying drawings, which are incorporated in and constitute a part of this specification, illustrate one or more implementations described herein and, together with the description, explain these one or more implementations. In the drawings.

DETAILED DESCRIPTION

The following detailed description refers to the accompanying drawings. The same reference numbers in different drawings may identify the same or similar elements.

A system and/or method, described herein, may enable one or more devices, such as one or more server devices implementing an information repository system, to provide results to timestamped queries (e.g., queries that request data as the data existed at a given time), even though the data within the information repository system may change continuously over time. Further, the information repository system, of one or more implementations, may be highly scalable, in that the information repository system may be implemented using multiple server devices that are each responsible for storing a portion of the information maintained by the information repository system. Additionally, or alternatively, the information repository system, of some implementations, may be highly reliable by including multiple sets of server devices that each store at least a partial duplicate of information stored by the other server devices.

Figure 1:
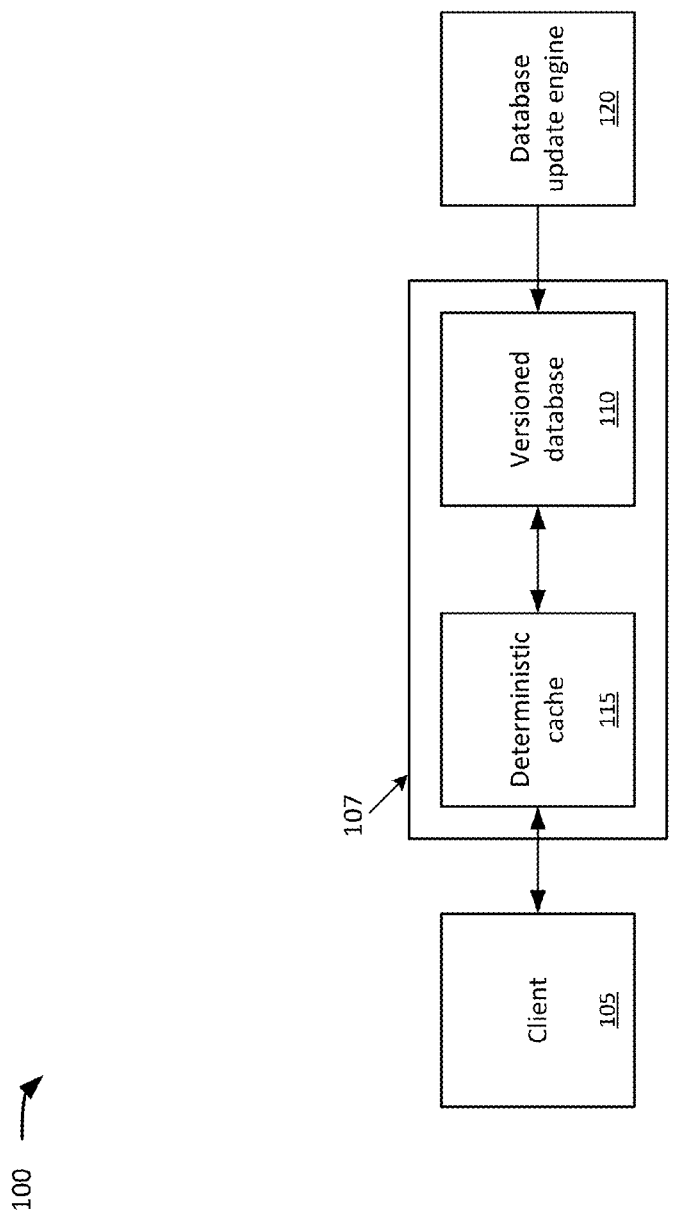
FIG. 1 illustrates an overview of an example implementation described herein.

FIG. 1 illustrates an example system 100 for providing results to a timestamped query. System 100 may include client 105, information repository 107, and database update engine 120. Client 105 may include one more devices that receive a query (e.g., from a user), provide the query to information repository 107, and receive one or more results, that are responsive to the query, from information repository 107.

In some examples, the query received by client 105 may be a timestamped query. A timestamped query may be a query that requests information associated with one or more criteria, as well as a particular time associated with the criteria. For example, a particular timestamped query may request identification of information associated with an advertising link that was selected, or "clicked," by a user at a particular time and/or during a particular time period. In some examples, the information, requested by the query, may include customer account information related to an advertising link that was shown (e.g. time zone information), information regarding where the advertising link was shown (e.g. a city, a region, a country, etc.), an identifier associated with the advertising link, one or more annotations associated with the advertising link that were provided by an advertiser (e.g., information, added by the advertiser, that is associated with the advertising link), anchor text associated with the advertising link, a location identifier (e.g., a Uniform Resource Locator ("URL"), a Uniform Resource Identifier ("URI"), etc.) associated with the advertising link, a cost per click associated with the advertising link, a cost per impression associated with the advertising link, or the like.

Information repository 107 may store information, and may provide portions of the stored information in response to queries, such as queries received from client 105. The information stored by information repository 107 may include multiple versions of data that has been updated over time. For example, information repository 107 may store information associated with a particular advertising link. At a particular time $t_0$, the advertising link may be associated with a cost per click of $0.01. At a later time $t_1$, the advertising link may be associated with a cost per click of $0.02. Information repository 107 may store information that identifies that the advertising link was associated with a cost per click of $0.01 at time $t_0$, and a cost per click of $0.02 at time $t_1$.

Assume, for example, that information repository 107 receives a timestamped query from client 105, requesting what the cost per click of the advertising link was at time $t_0$ (or between time $t_0$ and time $t_1$). In response to the timestamped query, information repository 107 may provide a result to client 105, indicating that the cost per click of the advertising link at the specified time was $0.01.

Information repository 107 may include versioned database 110 and deterministic cache 115. Versioned database 110 may include one or more devices that store a full set of information associated with information repository 107, while deterministic cache 115 may include one or more devices that store a portion of the information associated with information repository 107. When processing a query (e.g., a query from client 105), information repository 107 may determine whether information associated with the query (e.g., a result) is present in deterministic cache 115. If the information associated with the query is present in deterministic cache 115, information repository 107 may provide the information as a result to client 105. If, on the other hand, the information associated with the query is not present in deterministic cache 115, information repository 107 may search versioned database 110 for the information associated with the query.

Deterministic cache 115 may include information associated with recently retrieved query results. For example, when information repository 107 outputs a result from versioned database 110, information repository 107 may place information associated with the result in deterministic cache 115. In one implementation, deterministic cache 115 may include only a limited capacity to store information. Thus, when placing information associated with a particular result in deterministic cache 115, information repository 107 may overwrite, or delete, information associated with one or more other older results in deterministic cache 115. In one implementation, information repository 107 may overwrite older results in deterministic cache 115 according to a "least recently used" ("LRU") algorithm. For example, when adding information regarding a first result to deterministic cache 115, information repository 107 may determine that information regarding a second result, stored by deterministic cache 115, is the least recently retrieved information from deterministic cache 115 out of the information stored by deterministic cache 115. Information repository 107 may, therefore, overwrite the information regarding the second result, in deterministic cache 115, with the information regarding the first result. As further described below, versioned database 110 and/or deterministic cache 115 may each be implemented as one or more server devices in order to improve performance and/or reliability of information repository 107.

Database update engine 120 may include one or more devices that provide updates to information repository 107. For example, assume that database update engine 120 receives information identifying that the cost per impression of a particular advertising link has been changed from $0.02 per impression to $0.04 per impression. Database update engine 120 may provide the information to information repository 107. Information repository 107 may store the updated information associated with the cost per impression of the particular advertising link, as well as a time associated with the updated information. Thus, once updated, information repository 107 may store information that identifies both the $0.02 and the $0.04 versions of the cost per impression associated with the particular advertising link, as well as times associated with the versions of the cost per impression.

Figure 2:
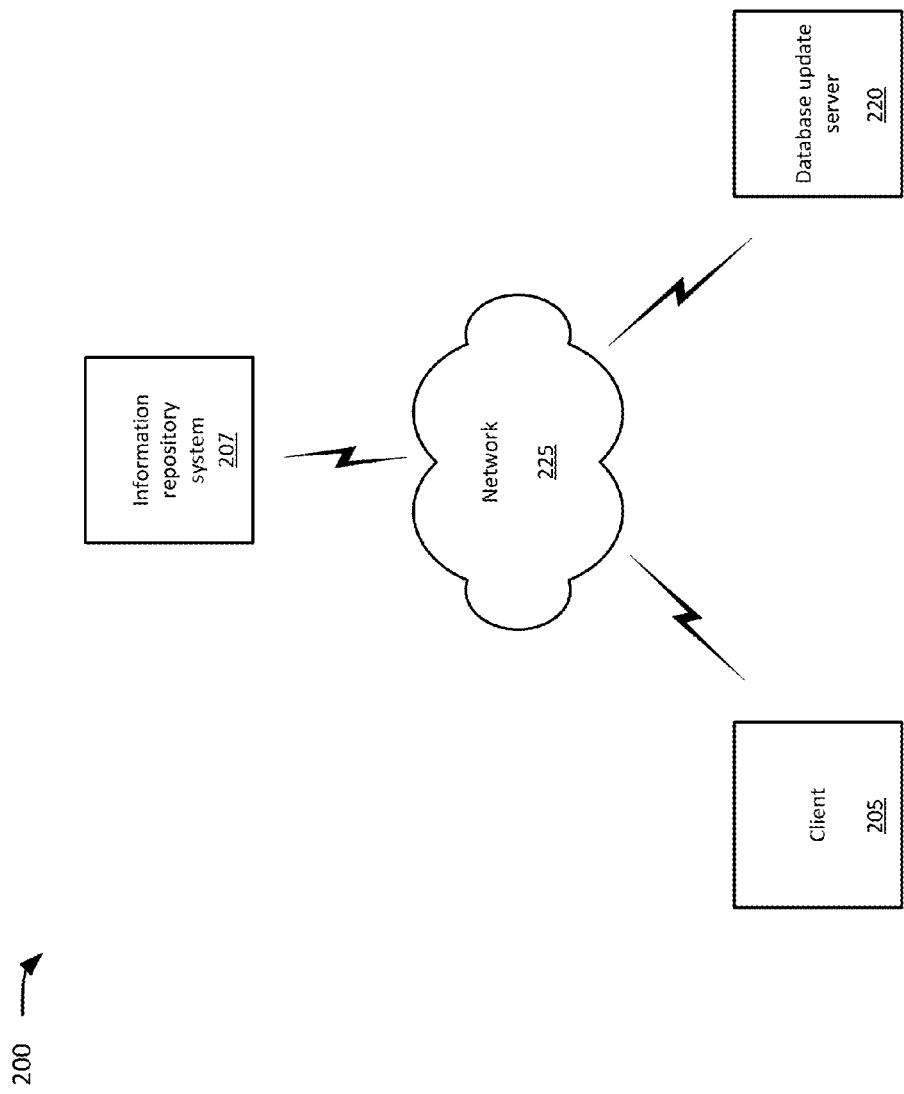
FIG. 2 illustrates an example environment in which systems and/or methods described herein may be implemented.

FIG. 2 is a diagram of an example environment 200 in which systems and/or methods described herein may be implemented. Environment 200 may include a client 205 and servers, such as information repository system 207 and database update server 220, connected to network 225. One client 205 and two servers (i.e., information repository system 207 and database update server 220, hereinafter collectively referred to as "servers 207 and 220") have been illustrated as connected to network 225 for simplicity. In practice, environment 200 may include additional clients and/or servers or fewer clients and/or servers. Also, in some instances, a client may perform a function of a server, and a server may perform a function of a client.

Client 205 may include a client device, such as personal computer, a wireless telephone, a personal digital assistant ("PDA"), a tablet computer, a laptop, or another type of computation or communication device. Client 205 may include user interfaces presented through one or more browsers, e.g., web browsers.

Servers 207 and 220 may each be implemented as a single server device or a collection of server devices that may be co-located or remotely located. Additionally, or alternatively, servers 207 and 220 may be implemented within a single, common server device or a single, common collection of server devices.

For example, information repository system 207 may include a set of server devices that implement versioned database 110. In one implementation, the set of server devices may include two or more server devices that each store a portion of information associated with versioned database 110, while the set of server devices together stores the entirety of the information associated with versioned database 110. Additionally, or alternatively, multiple server devices, that implement versioned database 110, may store some or all of the same information. In other words, versioned database 110 may include one or more servers that replicate data stored by one or more other servers of versioned database 110.

Additionally, or alternatively, information repository system 207 may include a set of server devices that implement deterministic cache 115. In one implementation, the set of server devices may include two or more server devices that each store a portion of information associated with deterministic cache 115, while the set of server devices together stores the entirety of the information associated with deterministic cache 115. Additionally, or alternatively, multiple server devices, that implement deterministic cache 115, may store some or all of the same information. In other words, deterministic cache 115 may include one or more servers that back up data stored by other one or more other servers of deterministic cache 115.

Information repository system 207 may include one or more server devices that perform functions described above with respect to information repository 107, and server 220 may include one or more server devices that perform functions described above with respect to database update engine 120. Additional servers (e.g., servers other than servers 207 and/or 220), implementing other functions, although not explicitly shown, may also be implemented in environment 200. The additional servers may provide, for example, web content, payment services, shopping services, social networking services, etc.

Network 225 may include any type of network, such as a local area network ("LAN"), a wide area network ("WAN"), a telephone network—e.g., the Public Switched Telephone Network ("PSTN") or a cellular network—an intranet, the Internet, or a combination of networks. Client 205 and servers 207 and/or 220 may connect to network 225 via wired and/or wireless connections. In other words, client 205 and/or any of servers 207 and/or 220 may connect to network 225 via a wired connection, a wireless connection, or a combination of a wired connection and a wireless connection.

Figure 3:
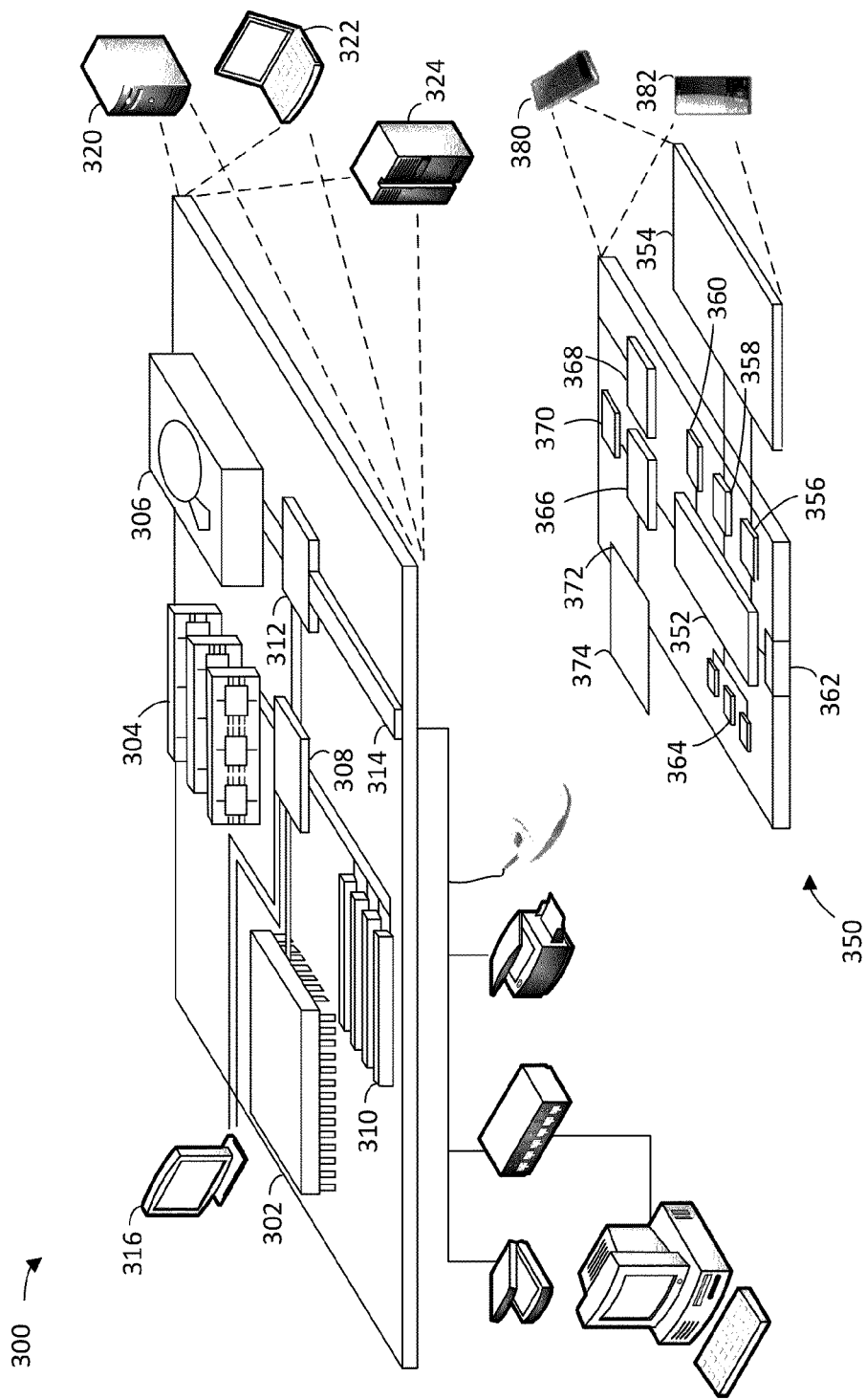
FIG. 3 shows an example of a generic computer device and a generic mobile computer device according to one or more implementations.

FIG. 3 shows an example of a generic computing device 300 and a generic mobile computing device 350, which may be used with the techniques described here. Generic computing device 300 and generic mobile computing device 350 may correspond to, for example, any of client 205, information repository system 207, and/or database update server 220. Each of client 205, information repository system 207, and/or database update server 220 may include one or more devices 300 and/or 350, or one or more of the components of devices 300 and/or 350.

Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smart phones, and other similar computing devices. The components shown in FIG. 3, their connections and relationships, and their functions, are meant to be examples only, and are not meant to limit implementations of the inventions described and/or claimed in this document.

Computing device 300 may include a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. Processor 302 can process instructions for execution within the computing device 300, including instructions stored in the memory 304 or on the storage device 306 to display graphical information for a graphical user interface ("GUI") on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations, e.g., as a server bank, a group of blade servers, or a multi-processor system, etc.

Memory 304 stores information within the computing device 300. In one implementation, memory 304 includes a volatile memory unit or units. In another implementation, memory 304 includes a non-volatile memory unit or units. The memory 304 may also be another form of computer-readable medium, such as a magnetic or optical disk. A computer-readable medium may be defined as a non-transitory memory device. A memory device may include space within a single physical memory device or spread across multiple physical memory devices.

The storage device 306 is capable of providing mass storage for the computing device 300. In one implementation, storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 304, storage device 306, or memory on processor 302.

High speed controller 308 manages bandwidth-intensive operations for the computing device 300, while low speed controller 312 manages lower bandwidth-intensive operations. Such allocation of functions is exemplary only. In one implementation, high-speed controller 308 is coupled to memory 304, display 316, e.g., through a graphics processor or accelerator, and to high-speed expansion ports 310, which may accept various expansion cards (not shown). In this implementation, low-speed controller 312 is coupled to storage device 306 and low-speed expansion port 314. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

Computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as mobile computing device 350. Each of such devices may contain one or more of computing devices 300, 350, and an entire system may be made up of multiple computing devices 300, 350 communicating with each other.

Mobile computing device 350 may include a processor 352, memory 364, an input/output ("I/O") device such as a display 354, a communication interface 366, and a transceiver 368, among other components. Mobile computing device 350 may also be provided with a storage device, such as a micro-drive or other device, to provide additional storage. Each of the components 350, 352, 364, 354, 366, and 368 are interconnected using various buses, and several of the components may be mounted on a common motherboard or in other manners as appropriate.

Processor 352 can execute instructions within mobile computing device 350, including instructions stored in memory 364. Processor 352 may be implemented as a chipset of chips that include separate and multiple analog and digital processors. Processor 352 may provide, for example, for coordination of the other components of mobile computing device 350, such as control of user interfaces, applications run by mobile computing device 350, and wireless communication by mobile computing device 350.

Processor 352 may communicate with a user through control interface 358 and display interface 356 coupled to a display 354. Display 354 may be, for example, a TFT LCD (Thin-Film-Transistor Liquid Crystal Display) or an OLED (Organic Light Emitting Diode) display, or other appropriate display technology. Display interface 356 may comprise appropriate circuitry for driving display 354 to present graphical and other information to a user. Control interface 358 may receive commands from a user and convert them for submission to the processor 352. In addition, an external interface 362 may be in communication with processor 352, so as to enable near area communication of mobile computing device 350 with other devices. External interface 362 may provide, for example, for wired communication in some implementations, or for wireless communication in other implementations, and multiple interfaces may also be used.

Memory 364 stores information within mobile computing device 350. Memory 364 can be implemented as one or more of a computer-readable medium or media, a volatile memory unit or units, or a non-volatile memory unit or units. Expansion memory 374 may also be provided and connected to mobile computing device 350 through expansion interface 372, which may include, for example, a SIMM (Single In Line Memory Module) card interface. Such expansion memory 374 may provide extra storage space for device 350, or may also store applications or other information for mobile computing device 350. Specifically, expansion memory 374 may include instructions to carry out or supplement the processes described above, and may include secure information also. Thus, for example, expansion memory 374 may be provide as a security module for mobile computing device 350, and may be programmed with instructions that permit secure use of device 350. In addition, secure applications may be provided via the SIMM cards, along with additional information, such as placing identifying information on the SIMM card in a non-hackable manner.

Expansion memory 374 may include, for example, flash memory and/or NVRAM memory. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352, that may be received, for example, over transceiver 368 or external interface 362.

Mobile computing device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS (Global Positioning System) receiver module 370 may provide additional navigation- and location-related wireless data to mobile computing device 350, which may be used as appropriate by applications running on mobile computing device 350.

Mobile computing device 350 may also communicate audibly using audio codec 360, which may receive spoken information from a user and convert it to usable digital information. Audio codec 360 may likewise generate audible sound for a user, such as through a speaker, e.g., in a handset of mobile computing device 350. Such sound may include sound from voice telephone calls, may include recorded sound, e.g., voice messages, music files, etc., and may also include sound generated by applications operating on mobile computing device 350.

Mobile computing device 350 may be implemented in a number of different forms, as shown in the figure. For example, it may be implemented as a cellular telephone 380. It may also be implemented as part of a smart phone 382, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" and "computer-readable medium" refers to any non-transitory apparatus and/or device, e.g., magnetic discs, optical disks, memory, Programmable Logic Devices ("PLDs"), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described herein can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a LAN, a WAN, and the Internet.

Figure 4A:
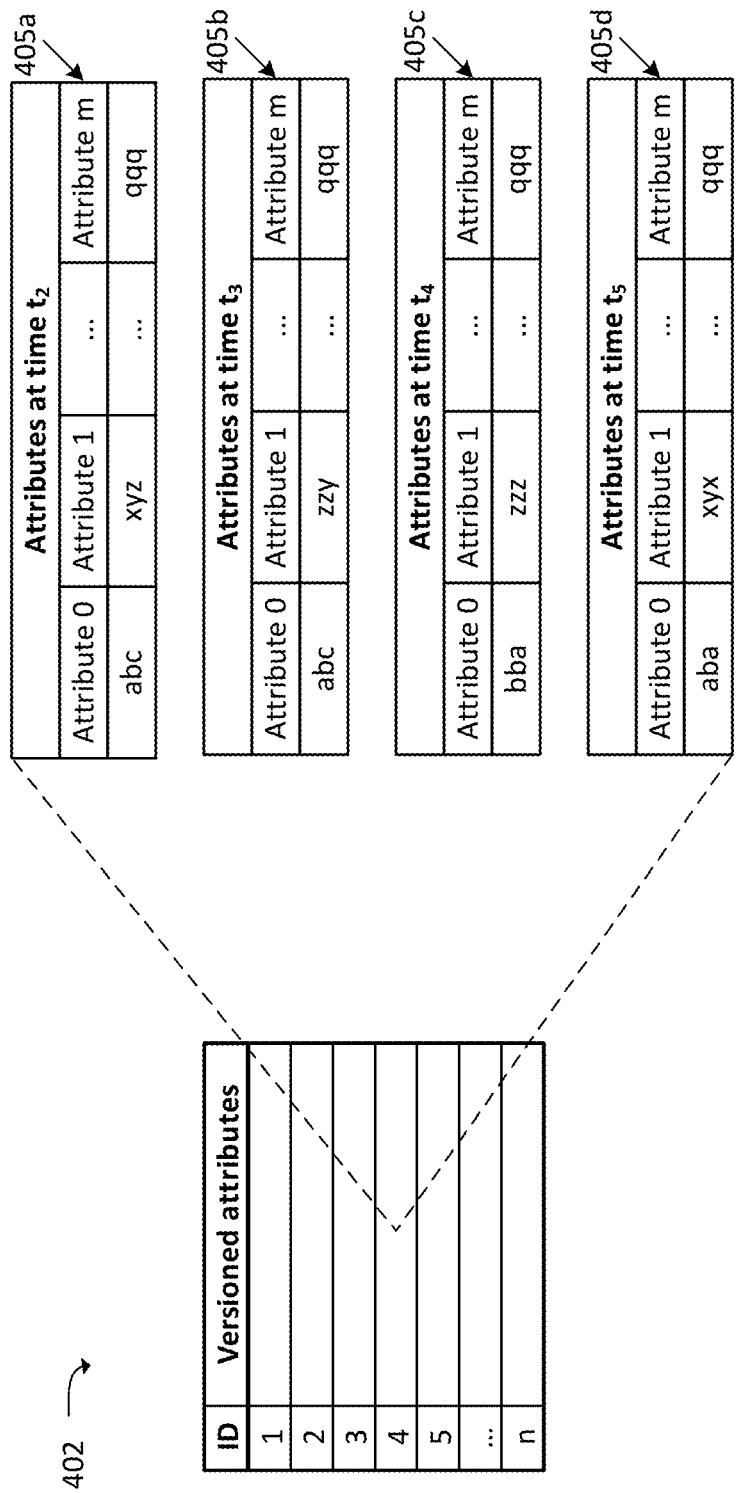
FIGS. 4A and 4B illustrate an example data structure that may be stored by an information repository system, according to one or more implementations described herein.
Figure 4B:
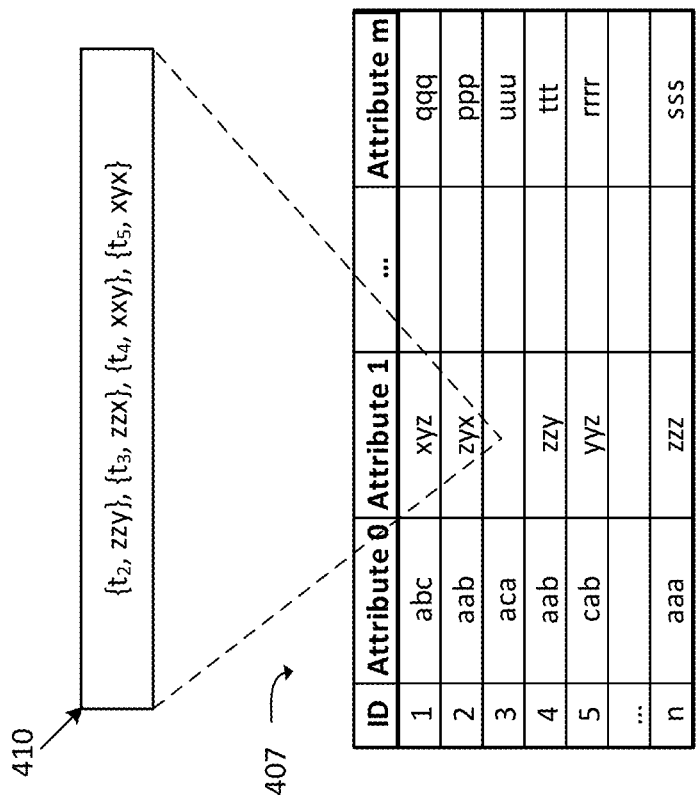

FIGS. 4A and 4B illustrate example data structures 402 and 407, respectively, that may be used by an information repository system, such as information repository system 207. In various implementations, information repository system 207 may store information using one of data structures 402 and 407, both of data structures 402 and 407, and/or a data structure that is different from example data structures 402 and 407.

FIG. 4A illustrates example data structure 402 in accordance with an implementation. Data structure 402 may be stored by one or more memory devices, such as one or more memory devices associated with information repository system 207. In one implementation, one or more devices implementing one or both of versioned database 110 and/or deterministic cache 115 may store information using data structure 402.

In one implementation, data structure 402 may include information regarding one or more items (e.g., advertising links, advertising events, or the like). For example, as indicated by the "ID" column shown in FIG. 4A, data structure may include information regarding items with the identifiers 1-n. The information associated with a particular item may include a set of attributes associated with the particular item. For example, if the particular item is an advertising link, the attributes may correspond to attributes of the particular advertising link, such as an identifier associated with the advertising link (e.g., an "ID" column, as shown in FIG. 4), one or more annotations associated with the advertising link that were provided by the advertiser, anchor text associated with the advertising link, a location identifier (e.g., a URL, a URI, etc.) associated with the advertising link, a cost per click associated with the advertising link, a cost per impression associated with the advertising link, or the like. If the particular item is an advertising event, the attributes may correspond to attributes of the particular advertising event, such as an impression of an advertising link, a selection (e.g., a click) of an advertising link, a conversion associated with an advertising link, or any other type of event.

The attributes for one or more of the items in data structure 402 may be a set of versioned attributes. In other words, data structure may store a set of attributes, associated with a particular item, as the set of attributes existed at a particular time (or during a particular time interval). For instance, as shown in FIG. 4A, the item with the identifier of "4" may be associated with a set of attributes (e.g., attributes 0-m). Assume that data structure received information updating one or more of the attributes associated with the particular item at time $t_2$, time $t_3$, time $t_4$, and time $t_5$. Data structure may store information at each of these times regarding the attributes associated with the particular item. For example, information 405a may be associated with an update received at time $t_2$, and may be considered valid for a timestamped query that specifies a time at or before time $t_2$. Information 405b may be associated with an update received at time $t_3$, and may be considered valid for a timestamped query that specifies a time at or before time $t_3$ and after time $t_2$. Information 405c may be associated with an update received at time $t_4$, and may be considered valid for a timestamped query that specifies a time at or before time $t_4$ and after time $t_3$. Information 405d may be associated with an update received at time $t_5$, and may be considered valid for a timestamped query that specifies a time at or before time $t_5$ and after time $t_4$.

FIG. 4B illustrates example data structure 407 in accordance with an implementation. Data structure 407 may be stored by one or more memory devices, such as one or more memory devices associated with information repository system 207. In one implementation, one or more devices implementing one or both of versioned database 110 and/or deterministic cache 115 may store information using data structure 407.

Data structure 407 may include one or more rows and one or more columns. In one implementation, each particular row may correspond to a particular item, while each particular column may correspond to a particular attribute of the particular item. For example, each row may correspond to a particular advertising link, while the columns may correspond to attributes of the particular advertising link, such as an identifier associated with the advertising link (e.g., an "ID" column, as shown in FIG. 4), one or more annotations associated with the advertising link that were provided by the advertiser, anchor text associated with the advertising link, a location identifier (e.g., a URL, a URI, etc.) associated with the advertising link, a cost per click associated with the advertising link, a cost per impression associated with the advertising link, or the like. Additionally, or alternatively, each row may correspond to a particular advertising event, such as an impression of an advertising link, a selection (e.g., a click) of an advertising link, a conversion associated with an advertising link, or any other type of event. While examples of rows and columns associated with data structure 407 are described above, in practice, data structure 407 may be associated with any type of information.

As also shown in FIG. 4, an entry in data structure 407 may include multiple instances of information associated with multiple different times. For example, entry 410 may include information for a particular attribute (i.e., "attribute 1") a particular advertising link with an identifier of "3." The information stored in entry 410 may include information associated with four different times: time $t_2$, time $t_3$, time $t_4$, and time $t_5$. Assume that time $t_3$ is later than time $t_2$, time $t_4$ is later than time $t_3$, and time $t_5$ is later than time $t_4$. The information stored in entry 410 may indicate, for example, that attribute 1 was associated with a value of "zzy" at time $t_2$, was changed to "zzx" at time $t_3$, was changed to "xxy" at time $t_4$, and was changed to "xyx" at time $t_5$.

While data structures 402 and 407 are represented in FIGS. 4A and 4B as tables with rows and columns, in practice, data structures 402 and/or 407 may include any type of data structure, such as a linked list, a tree, a hash table, or any other type of data structure. Data structures 402 and/or 407 may include information provided by server 220. Additionally, or alternatively, data structures 402 and/or 407 may include information provided from any other source, such as information provided by one or more users, and/or information automatically provided by one or more other devices. Furthermore, while data structures 402 and 407 were described in terms of storing information as the information existed at a particular time (e.g., as attributes existed at time $t_3$), data structures 402 and/or 407 may store information as the information existed during a particular time interval (e.g., as attributes existed between times $t_2$ and $t_3$).

Figure 5:
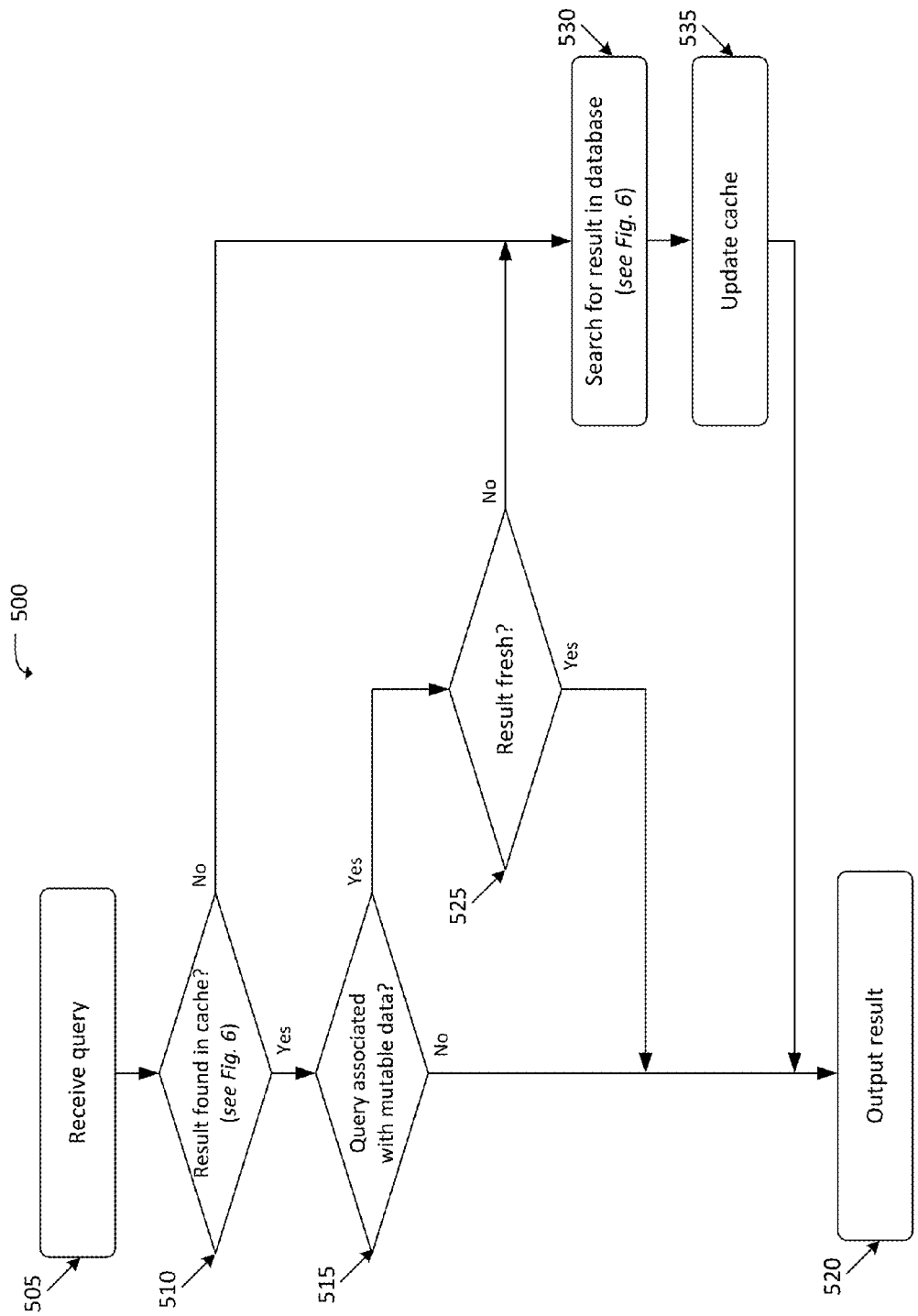
FIG. 5 illustrates a flowchart of an example process for providing a result for a query from a versioned cache, when the result is identified in the versioned cache, according to one or more implementations described herein.

FIG. 5 illustrates a flowchart of an example process 500 for providing a result for a query from a versioned cache, when the result is identified in the versioned cache. In one implementation, process 500 may be performed by information repository system 207. In another implementation, process 500 may be performed by one or more other components instead of, or possibly in conjunction with, information repository system 207.

Process 500 may include receiving a query (block 505). For example, information repository system 207 may receive a query from client 205. The query may be a timestamped query, which requests information associated with a particular time.

Process 500 may also include determining whether a result for the query was identified in a cache, such as in one or more devices implementing deterministic cache 115 (block 510). When determining whether the result was identified in the cache, information repository system 207 may search for an entry in a data structure stored by the cache, such as data structure 402 and/or 407, that matches the criteria specified by the query. For example, assume that the query requests a cost per click associated with a particular advertisement, and information repository system 207 may determine whether information regarding the cost per click associated with the particular advertisement and the particular time (e.g., a result that is responsive to the query) is stored by deterministic cache 115.

If the result for the query was identified in the cache (block 510—YES), then process 500 may further include determining whether the query is associated with mutable data (block 515). Examples of identifying whether the query is associated with mutable data are described below with respect to FIG. 6. If the query is not associated with mutable data (block 515—NO), then process 500 may include outputting the result (block 520). For example, information repository system 207 may provide the result to client 205. In one implementation, information repository system 207 may format the result for display by client 205 (e.g., information repository system 207 may format the result by adding information to the result, removing information from the result, and/or modifying information associated with the result). Furthermore, in one implementation, information repository system 207 may store information indicating that the result was provided to client 205, information indicating a time that the result was provided to client 205, and/or information indicating a time that the query was received. Information repository system 207 may use this information when determining which entries, in deterministic cache 115, to overwrite when adding new entries to deterministic cache 115.

If, on the other hand, the query is associated with mutable data (block 515—YES), then process 500 may further include determining whether the result is fresh (block 525). For example, deterministic cache 115 may store freshness information that indicates how fresh cached information, stored by deterministic cache 115, is. For instance, assume that deterministic cache 115 stores information regarding a result (identified at block 510), that indicates a cost per click associated with a particular advertisement. Deterministic cache 115 may also store freshness information associated with the cost per click information. The freshness information may allow information repository system to determine that the cost per click information is fresh until a particular time.

If the result is fresh (block 515—YES), then process 500 may include outputting the result (block 520). If, on the other hand, the result for the query was not identified in the cache (block 510—NO) or if the result is not fresh (block 525—NO), then process 500 may include searching for the result in a database, such as one or more devices implementing versioned database 110 (block 530).

Process 500 may further include updating the cache (block 535). For example, when outputting the result (at block 530), information repository system 207 may provide some or all of the information associated with the result to deterministic cache 115. For example, assume that the query (received at block 505) requests a cost per click associated with a particular advertising link at a particular time. Further assume that versioned database 110 stores ten sets of attributes associated with the particular advertising link, each set being associated with a different version of the attributes associated with the particular advertising link. In one implementation, information repository system 207 may provide fewer than ten (e.g., two, five, seven, etc.) of the ten sets of attributes, associated with the advertising link, to deterministic cache 115.

In one such implementation, information repository system 207 may provide a single set of attributes to deterministic cache 115. For example, in one implementation, information repository system 207 may provide only a set of attributes associated with a time (e.g., a time interval) that is associated with an identified result (e.g., a result identified at block 530).

In another implementation, information repository system 207 may provide multiple sets of attributes to deterministic cache 115. In one such implementation, information repository system 207 may provide only the most recent (e.g., the two most recent, the five most recent, the seven most recent, etc.) sets of attributes, associated with the particular advertising link, to deterministic cache 115.

In another example, assume that versioned database 110 stores the cost per click associated with the particular advertising link at ten different times. In one implementation, information repository system 207 may provide fewer than ten (e.g., two, five, seven, etc.) of the ten versions of the cost per click, associated with the advertising link, to deterministic cache 115. In such an implementation, information repository system 207 may provide only the most recent (e.g., the two most recent, the five most recent, the seven most recent, etc.) version of the cost per click, associated with the particular advertising link, to deterministic cache 115.

In one implementation, information repository system 207 may provide only the versions of the cost per click that are within a particular time window from a present time to deterministic cache 115. For example, assume that the particular time window is fourteen days. In such an implementation, information repository system 207 may provide only the versions of the cost per click, associated with the particular advertising link, that are fourteen days old, or newer, to deterministic cache 115.

In one implementation, when providing information to deterministic cache 115, information repository system 207 may provide time information, such as a time interval, associated with the information. For example, assume that information repository system 207 provides information regarding a particular version of a cost per click that is valid from time $t_0$ to time $t_1$. Information repository system 207 may provide the particular version of the cost per click to deterministic cache 115 for storage by deterministic cache 115, and information indicating that the particular version of the cost per click is valid from time $t_0$ to time $t_1$.

Storing an interval, associated with a version of information, in deterministic cache 115 may be desirable, as chronologically non-contiguous versions of information may be stored in deterministic cache 115 in some scenarios. For example, assume that a particular advertising link is associated with four versions of a cost per click. Further assume that the first version of the cost per click is valid before time $t_0$, that the second version of the cost per click is valid between time $t_0$ and time $t_1$, that the third version of the cost per click is valid between time $t_1$ and time $t_2$, and that that the fourth version of the cost per click is valid between time $t_2$ and time $t_3$. A scenario may arise in which deterministic cache 115 stores the second version and the fourth version, but not the first version or the fourth version. In other words, in such a scenario, deterministic cache 115 may store chronologically non-contiguous versions of the cost per click associated with the particular advertising link.

Additionally, or alternatively, when providing information regarding the result to deterministic cache 115, information repository system 207 may provide freshness information, associated with the result, to deterministic cache 115. For example, the freshness information may be used to indicate a time until which the information regarding the result is to be considered fresh. In one implementation, the freshness information may be based on a minimum interval at which versioned database 110 may be updated (e.g., receive an update from server 220). In one implementation, the freshness information may include a time at which the result was provided to deterministic cache 115. Based on this past time, information repository system 207 may determine until when the result may be considered fresh. In another implementation, the freshness information may include a time in the future (e.g., a time at which versioned database 110 may possibly receive an update).

When updating deterministic cache 115 (at 535), information repository system 207 may overwrite existing information stored by deterministic cache 115. In one implementation, information repository system 207 may use an LRU algorithm or a similar technique when determining which information to overwrite. For example, information repository system 207 may overwrite information, stored by deterministic cache 115, that has not been identified as a result (e.g., at block 510) for the longest amount of time out of the information stored by deterministic cache 115. Additionally, or alternatively, information repository system 207 may determine which information to overwrite by determining how often information, stored by deterministic cache 115, has been retrieved. Such an implementation may be desirable, since it may be desirable to store frequently retrieved information in deterministic cache 115, even if the information has not been retrieved recently.

Process 500 may further include outputting a result of the searching (at block 520). For example, information repository system 207 may search for and provide the result to client 205. As will be further described below, the result may include information stored by versioned database 110, or an indication that a result was not identified in versioned database 110.

FIGS. 6-10 illustrate flowcharts example processes 600, 700, 800, 850, 900, 950, and 1000 for providing a result for a query from an information repository system. In one implementation, processes 600, 700, 800, 850, 900, 950, and 1000 may be performed by information repository system 207. In another implementation, processes 600, 700, 800, 850, 900, 950, and 1000 may be performed by one or more other components instead of, or possibly in conjunction with, information repository system 207.

Figure 6:
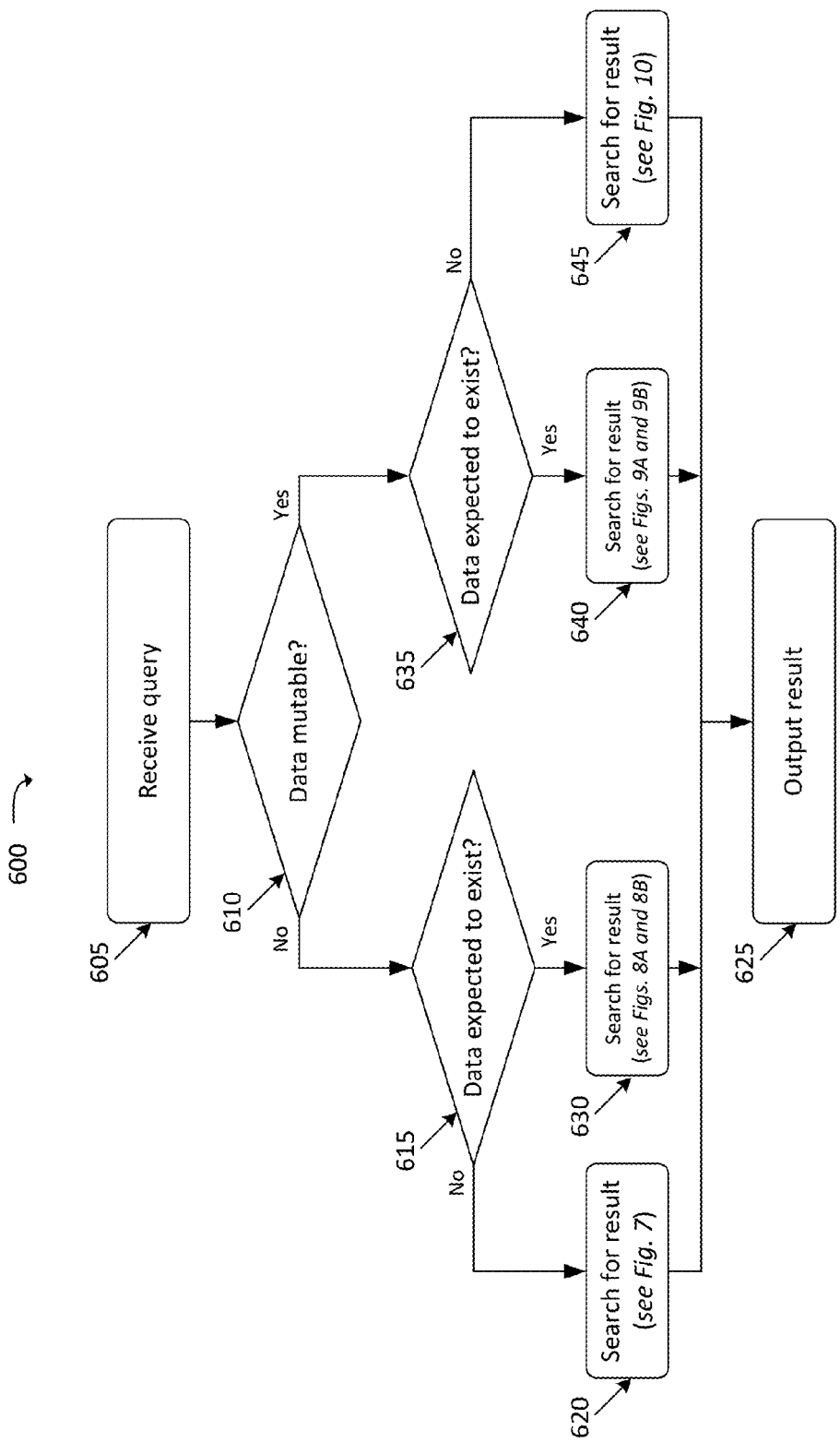
FIGS. 6-10 illustrate flowcharts of example processes for providing a result for a query from a versioned cache and/or a versioned database, according to one or more implementations described herein.

Parts of process 600, shown in FIG. 6, may correspond to block 510 of FIG. 5. For example, information repository system 207 may search for a result in deterministic cache 115 according to process 600, in accordance with one implementation. Additionally, or alternatively, parts of process 600 may correspond to block 530 of FIG. 5. For example, information repository system 207 may search for a result in versioned database 110 according to process 600, in accordance with one implementation.

Process 600, shown in FIG. 6, may include receiving a query (block 605). For example, information repository system 207 may receive a query from client 205. In one implementation, the query may be the query received at block 505 of FIG. 5. The query may be a timestamped query, which requests information associated with a particular time.

Process 600 may also include determining whether data, associated with the query, is mutable data (block 610). Mutable data may include data that may change over time, while immutable data may include data that is not expected to change over time. For example, mutable data may include a cost per click associated with an advertising link, a cost per impression associated with an advertising link, annotations associated with an advertising link, anchor text associated with an advertising link, or other types of data that may change over time. Examples of immutable data may include an identifier associated with an advertiser who provided a particular advertising link, a keyword associated with an advertisement (e.g., a keyword provided by an advertiser in conjunction with an advertisement, based upon which an auction for displaying the advertisement was won), an identifier associated with an advertising link, a language of a browser associated with an advertising event (e.g., a selection of an advertising link), a browser type associated with an advertising event, an Internet Protocol ("IP") address of a device associated with an advertising event, or other types of data that are not expected to change over time.

While the above are examples of mutable and/or immutable types of data according to one implementation, one or more of the mutable types of data described above may be considered immutable in one or more other implementations. Additionally, or alternatively, one or more of the immutable types of data described above may be considered mutable in one or other more implementations.

In order to make this determination (at block 610), information repository system 207 may store and look up information identifying types of data as mutable and/or immutable. For example, assume that information repository system 207 receives (at block 605) a query that requests a cost per click associated with a particular advertising link. Information repository system 207 may determine, based on stored information that indicates that cost per click data is mutable data, that the query is associated with mutable data. In another example, assume that information repository system 207 receives (at block 605) a query that requests an identifier of an advertising link associated with a particular advertising event. In this example, information repository system 207 may determine, based on stored information that indicates that identifiers are immutable data, that this query is associated with immutable data.

If the data is immutable (block 610—NO), process 600 may include determining whether the data is expected to exist (block 615). In order to make this determination (at block 615), information repository system 207 may store and look up information identifying types of data that are expected to exist and/or are not necessarily expected to exist. Examples of types of data that may be expected to exist may include an identifier associated with an advertiser who provided a particular advertising link, an identifier associated with an advertising link, a URL associated with an advertising link, anchor text associated with an advertising link, an IP address of a device associated with an advertising event, etc. Examples of types of data that may not necessarily be expected to exist may include a language associated with an advertising link, annotations associated with an advertising link, a language of a browser associated with an advertising event, a browser type associated with an advertising event, etc.

While the above are examples of types of data that are expected to exist and/or are not necessarily expected to exist according to one implementation, one or more of the types of data described above that are expected to exist may not necessarily be expected to exist in one or more other implementations. Additionally, or alternatively, one or more of the types of data described above that are not necessarily expected to exist may be expected to exist in one or more other implementations.

If the data is not necessarily expected to exist (block 615—NO), then process 600 may include searching for a result according to process 700, which is described further below with respect to FIG. 7 (block 620). Process 600 may further include outputting the result (block 625). As further explained below with respect to FIG. 7, outputting the result may possibly include outputting an indication that no result was identified.

If the data is immutable (block 610—NO) and the data is expected to exist (block 615—YES), then process 600 may include searching for a result according to process 800 or 850, depending on whether process 600 is being performed on versioned database 110 or deterministic cache 115 (block 630). Processes 800 and 850 are described further below with respect to FIG. 8A and FIG. 8B, respectively. Process 600 may further include outputting the result (block 625).

If the data is mutable (block 610—YES), process 600 may include determining whether the data is expected to exist (block 635). This determination may be made in a manner similar to that described above. If the data is expected to exist (block 635—YES), then process 600 may include searching for a result according to process 900 or 950, depending on whether process 600 is being performed on versioned database 110 or deterministic cache 115 (block 640). Processes 900 and 950 are described further below with respect to FIG. 9A and FIG. 9B, respectively. Process 600 may further include outputting the result (block 625).

If the data is mutable (block 610—YES) and the data is not necessarily expected to exist (block 635—NO), then process 600 may include searching for a result according to process 1000, which is described further below with respect to FIG. 10 (block 645). Process 600 may further include outputting the result (block 625). As further explained below with respect to FIG. 10, outputting the result may possibly include outputting an indication that no result was identified.

Figure 7:
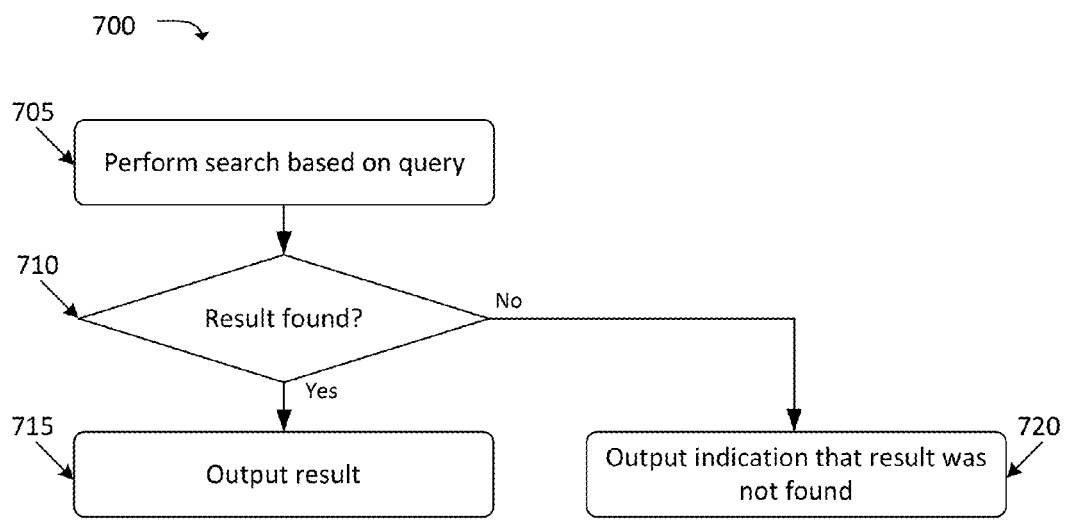

As mentioned above, when searching for data that is immutable, and is not necessarily expected to exist, information repository system 207 may perform search using process 700, shown in FIG. 7. For example, information repository system 207 may perform a search using process 700 in response to receiving a query (e.g., a query received at block 605) that requests a language of a browser associated with an advertising event.

Process 700 may include performing a search based on a query, such as the query received at block 605 (block 705). For example, assume that information repository system 207 searches (at block 705) for a result to the query in versioned database 110. Further assume that versioned database 110 is implemented by two or more server devices. Information repository system 207 may provide the query to the two or more server devices. Each of the two or more server devices may search one or more memory devices, respectively associated with each of the two or more server devices, for a result that is responsive to the query. For example, assume that versioned database 110 is implemented by two server devices, which are each associated with one memory device. A first one of the two server devices may search the memory device associated with the first server device, while the second one of the two server devices may search the memory device associated with the second server device.

Process 700 may include determining whether a result was identified for the query (block 710). If a result was identified (block 710—YES), then process 700 may include outputting the result (block 715). If, on the other hand, a result was not identified (block 710—NO), then process 700 may include outputting an indication that a result was not identified (block 720).

In the example described with respect to FIG. 7, since the data is immutable, it is not expected that the result would have multiple values associated with multiple different times. Furthermore, since the data is not necessarily expected to exist, information repository system 207 may output an indication that the result was not identified when the result is not identified, as opposed to taking other measures, as described in other examples below. As described above with respect to FIG. 5, if process 700 is performed on versioned database 110, when outputting the result (at block 715), information repository system 207 may update deterministic cache 115 (at block 535) based on the result.

Figure 8A:
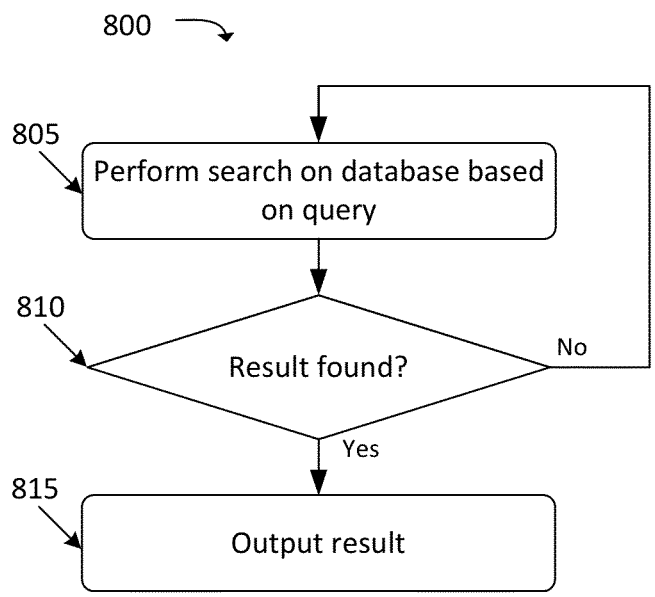
Figure 8B:
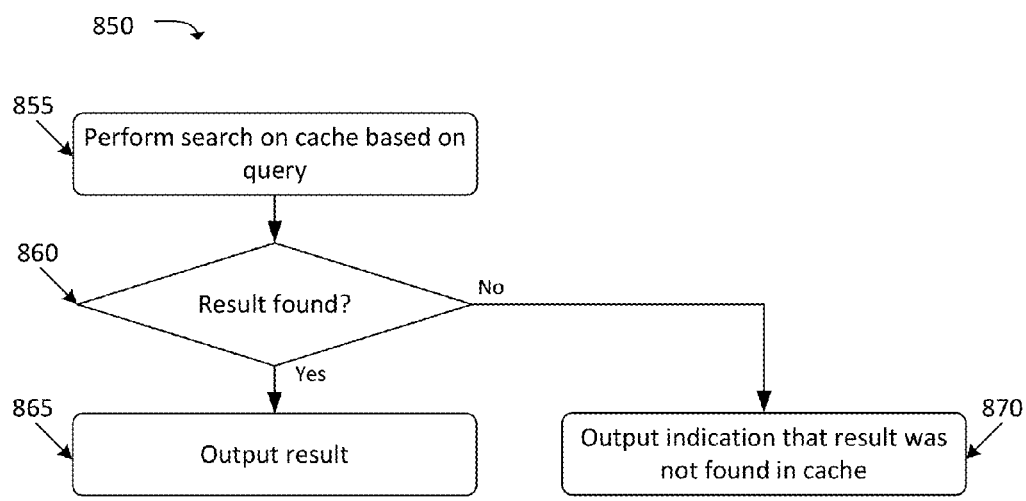

As mentioned above, when searching versioned database 110 for data that is immutable, and is expected to exist, information repository system 207 may perform a search using process 800 and/or 850, shown in FIGS. 8A and 8B, respectively. For example, information repository system 207 may perform a search using process 800 and/or 850 in response to receiving a query (e.g., a query received at block 605) that requests an identifier associated with an advertising link that is associated with a particular advertising event. In one implementation, information repository system 207 may perform a search using process 800 when searching versioned database 110, and may perform a search using process 850 when searching deterministic cache 115.

Process 800, shown in FIG. 8A, may include performing a search on versioned database 110 based on a query, such as the query received at block 605 (block 805). For example, information repository system 207 may search versioned database 110 for a result that is responsive to the query. Process 800 may include determining whether a result was identified for the query (block 810). If a result was identified (block 810—YES), then process 800 may include outputting the result (block 815). As described above with respect to FIG. 5, when outputting the result (at block 815), information repository system 207 may update deterministic cache 115 (at block 535) based on the result.

If, on the other hand, a result was not identified (block 810—NO), then process 800 may include periodically searching again for the result (e.g., every ten seconds, every minute, every hour, every six hours, every day, etc.), since the data is expected to exist (block 805). In one implementation, information repository system 207 may periodically re-search the result when the result is not found in versioned database 110. In other implementation, information repository system 207 may provide an indication to client 205 that the result was not found, and client 205 may periodically re-send the query to information repository system 207 until the result is found.

The data may not exist in versioned database 110 because, for example, versioned database 110 may not yet have received an update from server 220. Such a situation may occur when, for example, a query requests an identifier associated with an advertising link associated with a particular advertising event. In other words, a requester of the query may be aware of the particular advertising event before versioned database 110 receives information regarding the advertising link associated with the particular advertising event.

In one implementation, information repository system 207 may perform a search based on the query (at block 805) only a particular quantity of times. If information repository system 207 does not identify a result after the particular quantity of searches, information repository system 207 may output an indication that the result was not identified.

In the example described with respect to FIG. 8A, since the data is immutable, it is not expected that the result would have multiple values associated with multiple different times. Furthermore, since the data is expected to exist, information repository system 207 may search versioned database 110 and/or deterministic cache 115 until a result is identified.

As mentioned above, FIG. 8B illustrates an example process 850 for searching deterministic cache 115 for data that is immutable and is expected to exist. In one implementation, information repository system 207 may perform process 850. For example, information repository system 207 may perform a search on deterministic cache 115 using process 850 in response to receiving a query (e.g., a query received at block 605) that requests an identifier associated with an advertising link that is associated with a particular advertising event.

Process 850 may include performing a search on deterministic cache 115 based on a query, such as the query received at block 605 (block 855). For example, information repository system 207 may search deterministic cache 115 for a result that is responsive to the query. Process 850 may include determining whether a result was identified for the query (block 860). If a result was identified (block 860—YES), then process 800 may include outputting the result (block 865). If, on the other hand, a result was not identified (block 860—NO), then process 850 may include outputting an indication that the result was not found in the cache (block 870). Referring back to FIG. 5, information retrieval system may use this indication to determine (at block 510) that the result was not found in the cache.

Figure 9A:
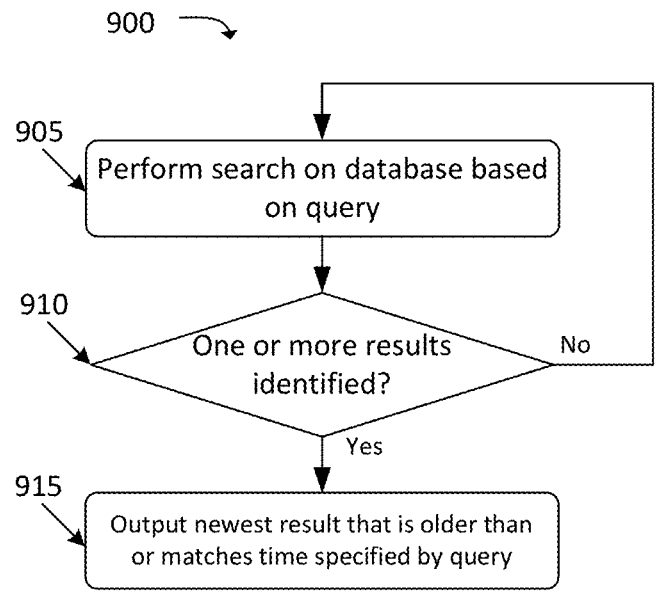
Figure 9B:
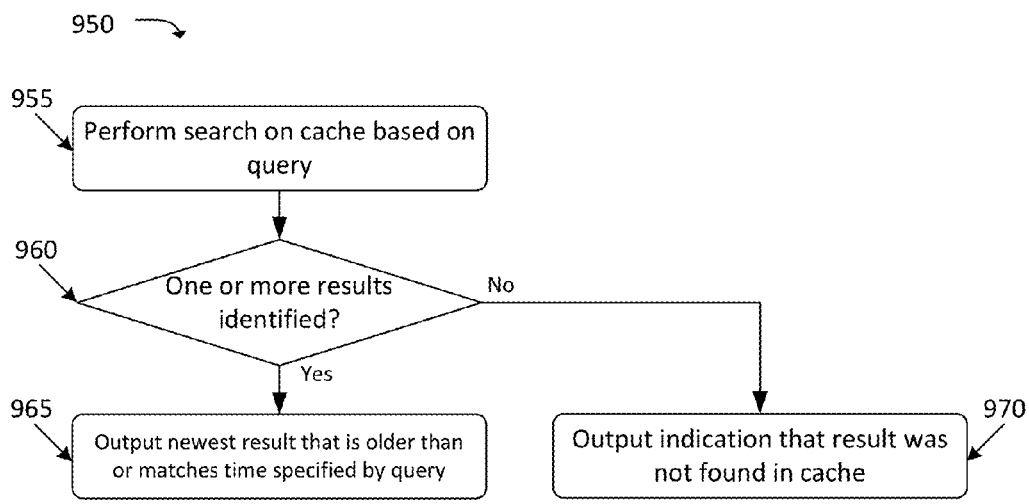

As mentioned above, when searching for data that is mutable, and is expected to exist, information repository system 207 may perform a search using process 900 and/or 950, shown in FIGS. 9A and 9B, respectively. For example, information repository system 207 may perform a search using processes 900 and/or 950 in response to receiving a query (e.g., a query received at block 605) that requests a cost per click associated with a particular advertising link at a particular time. In one implementation, information repository system 207 may perform a search using process 900 when searching versioned database 110, and may perform a search using process 950 when searching deterministic cache 115.

Process 900, shown in FIG. 9A may include performing a search on versioned database 110 based on a query, such as the query received at block 605 (block 905). The query may be a timestamped query (e.g., a query that requests information associated with a particular time). Information repository system 207 may, for example, search versioned database 110 for a result that is responsive to the query. Process 900 may include determining whether one or more results were identified for the query (block 910). As mentioned above, since the data is mutable, multiple values may exist in versioned database 110. For example, a cost per click associated with a particular advertising link may change over time, and versioned database 110 may store information regarding multiple versions of the cost per click of the particular advertising link, as well as times that these multiple versions of the cost per click were valid.

In one implementation, when determining whether one or more results are identified (at block 910), information repository system 207 may search for a result that is associated with the time specified by the query, or a time earlier than the specified time. If information repository system 207 does not identify a result that is associated with the time specified by the query, or a time earlier than the specified time, information repository system 207 may determine that one or more results have not been identified.

If one or more results were identified (block 910—YES), then process 900 may include outputting the newest result that is older than, or matches, the time specified by the query (block 915). For example, assume that information repository system 207 searches (at block 905) versioned database 110 for a cost per click associated with a particular advertising link at time $t_6$. Further assume that versioned database 110 stores information associated with two versions of the cost per click associated with the particular advertising link—a cost per click associated with the particular advertising link at time $t_7$ (or a version of the cost per click at a time interval that ends at time $t_7$), and a cost per click associated with the particular advertising link at time $t_8$ (or a version of the cost per click at a time interval between time $t_7$ and time $t_8$). Further assume that $t_8$ is later than time $t_7$, and that time $t_6$ is between time $t_7$ and time $t_8$. In this example, information repository system 207 may output (at block 915) the cost per click associated with the particular advertising link at time $t_7$. As described above with respect to FIG. 5, when outputting the result (at block 915), information repository system 207 may update deterministic cache 115 (at block 535) based on the result.

If, on the other hand, a result was not identified (block 910—NO), then process 900 may include periodically searching again for the result (e.g., every ten seconds, every minute, every hour, every six hours, every day, etc.), since the data is expected to exist (block 905). As similarly described above with respect to FIG. 8A, information repository system 207 may periodically search again for the result according to one implementation, while client 205 may periodically provide the query again according to another implementation.

In the example described with respect to FIG. 9A, since the data is mutable, information repository system 207 may provide a correct result that is associated with the time specified by the query. Furthermore, since the data is expected to exist, information repository system 207 may search versioned database 110 until a result is identified.

As mentioned above, FIG. 9B illustrates an example process 950 for searching deterministic cache 115 for data that is mutable and is expected to exist. In one implementation, information repository system 207 may perform process 950. For example, information repository system 207 may perform a search on deterministic cache 115 using process 950 in response to receiving a query (e.g., a query received at block 605) that requests a cost per click associated with a particular advertising link.

Process 950 may include performing a search on deterministic cache 115 based on a query, such as the query received at block 605 (block 955). For example, information repository system 207 may search deterministic cache 115 for a result that is responsive to the query. Process 950 may include determining whether a result was identified for the query (block 960). As similarly described with respect to block 915 of FIG. 9A, if a result was identified (block 960—YES), then process 900 may include outputting the newest result that is older than, or matches, the time specified by the query (block 965). If, on the other hand, a result was not identified (block 960—NO), then process 950 may include outputting an indication that the result was not found in the cache (block 970). Referring back to FIG. 5, information retrieval system may use this indication to determine (at block 510) that the result was not found in the cache.

Figure 10:
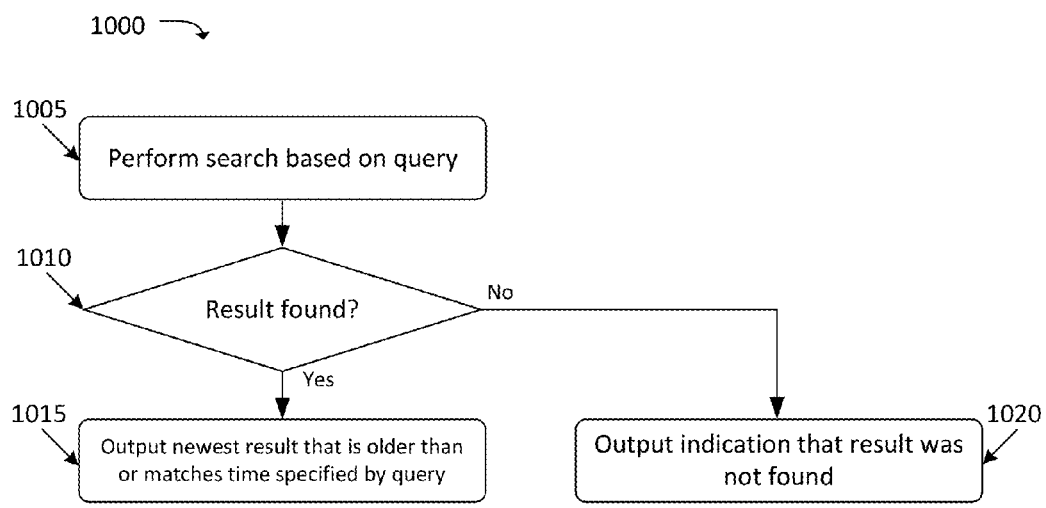

As mentioned above, when searching for data that is mutable, and is not necessarily expected to exist, information repository system 207 may perform a search using process 1000, shown in FIG. 10. For example, information repository system 207 may perform a search using process 1000 in response to receiving a query (e.g., a query received at block 605) that requests information regarding annotations associated with a particular advertising link.

Process 1000 may include performing a search based on a query, such as the query received at block 605 (block 1005). The query may be a timestamped query (e.g., a query that requests information associated with a particular time). Information repository system 207 may, for example, search versioned database 110 and/or deterministic cache 115 for a result that is responsive to the query. Process 1000 may include determining whether one or more results were identified for the query (block 1010). As mentioned above, since the data is mutable, multiple values may exist in versioned database 110 and/or deterministic cache 115. For example, annotations associated with a particular advertising link may change over time, and versioned database 110 and/or deterministic cache 115 may store information regarding multiple versions of annotations associated with the particular advertising link, as well as times that these versions of annotations were valid.

In one implementation, when determining whether one or more results were identified (at block 1010), information repository system 207 may search for a result that is associated with the time specified by the query, or a time earlier than the specified time. If information repository system 207 does not identify a result that is associated with the time specified by the query, or a time earlier than the specified time, information repository system 207 may determine that one or more results have not been identified. Additionally, or alternatively, as discussed above with respect to FIG. 5, when determining whether one or more results are identified (at block 1010), information repository system 207 may determine whether a result is fresh, if information repository system 207 is searching deterministic cache 115.

If one or more results were identified (block 1010—YES), then process 1000 may include outputting the newest result that is older than, or matches, the time specified by the query (block 1015). For example, assume that information repository system 207 searches (at block 1005) versioned database 110 for an annotation associated with a particular advertising link at time $t_9$. Further assume that versioned database 110 stores information associated with two versions of an annotation associated with the particular advertising link—a version of the annotation associated with the particular advertising link at time $t_{10}$ (or a version of the annotation associated with the particular advertising link at a time interval that ends at time $t_{10}$), and a version of the annotation associated with the particular advertising link at time $t_{11}$ (or a version of the annotation associated with the particular advertising link at a time interval between time $t_{10}$ and time $t_{11}$). Further assume that $t_{11}$ is later than time $t_{10}$, and that time $t_9$ is between time $t_{10}$ and time $t_{11}$. In this example, information repository system 207 may output (at block 1015) the annotation associated with the particular advertising link at time $t_{10}$. As described above with respect to FIG. 5, if process 1000 is performed on versioned database 110, when outputting the result (at block 1015), information repository system 207 may update deterministic cache 115 (at block 535) based on the result.

If, on the other hand, a result was not identified (block 1010—NO), then process 1000 may include outputting an indication that a result was not found (at block 1020).

In the example described with respect to FIG. 10, since the data is mutable, information repository system 207 may provide a correct result that is associated with the time specified by the query. Furthermore, since the data is not necessarily expected to exist, information repository system 207 may output an indication that the result was not identified when the result is not identified, as opposed to taking other measures, as described in other examples above. As described above with respect to FIG. 5, if process 700 is performed on versioned database 110, when outputting the result (at block 715), information repository system 207 may update deterministic cache 115 (at block 535) based on the result.

Figure 11:
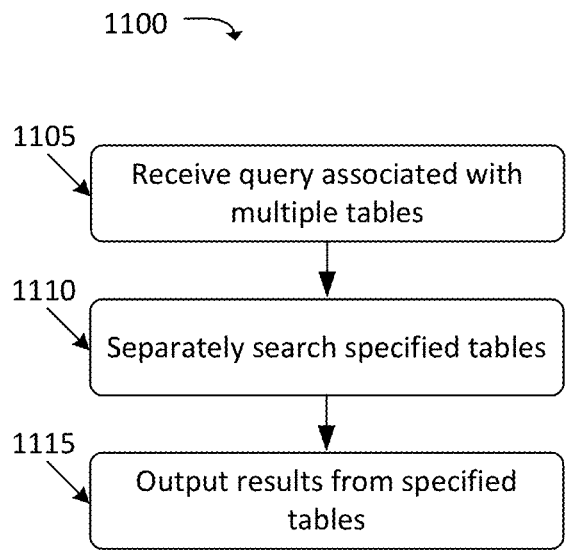
FIG. 11 illustrates a flowchart of an example process for providing results for a query that is associated with multiple tables, according to one or more implementations described herein.

FIG. 11 illustrates a flowchart of an example process 1100 for providing results for a query that is associated with multiple tables. For example, one table (e.g., one instance of data structure 405 and/or 407), stored by information repository system 207, may be associated with text advertisements, while another table (e.g., another instance of data structure 402 and/or 407), stored by information repository system 207, may be associated with image advertisements. In one example, multiple different tables may be stored by multiple different server devices. A particular query may request, for example, advertisement identifiers (of text advertisements and/or image advertisements) associated with advertising events associated with a particular set of IP addresses (e.g., clicks on advertising links that were received from devices that are associated with the particular set of IP addresses). In one implementation, process 1100 may be performed by information repository system 207. In another implementation, process 1100 may be performed by one or more other components instead of, or possibly in conjunction with, information repository system 207.

Process 1100 may include receiving a query associated with multiple tables (block 1105). For example, information repository system 207 may receive a query from client 205 that requests information from a table associated with text advertisements and from a table associated with image advertisements. Assume, for example, that the query requests advertisement identifiers (of text advertisements and/or image advertisements) associated with advertising events associated with a particular set of IP addresses.

Process 1100 may also include separately searching the specified tables (block 1110). For instance, information repository system 207 may search for advertisement identifiers of text advertisements associated with advertising events associated with the particular set of IP addresses, and may also search for advertisement identifiers of image advertisements associated with advertising events associated with the particular set of IP addresses. In one implementation, when separately searching the specified tables, information repository system 207 may provide the query to (and/or perform a search on) two or more devices that each store information associated with a different one of the tables. In other words, information repository system 207 may provide the query to a first set of server devices that stores information associated with text advertisements, and may further provide the query to a second set of server devices that stores information associated with image advertisements.

In one implementation, when separately searching the specified tables, information repository system 207 may search the tables separately in lieu of joining the tables first, and searching the joined tables. By searching the tables separately instead of searching the joined tables, information repository system 207 may save resources (e.g., memory resources, processing resources, etc.) that would have been expended by joining the tables and performing a search on the joined tables.

Process 1100 may additionally include outputting results from the specified tables (block 1115). For example, assume that information repository system 207 may provide one or more results from multiple tables to client 205.

An implementation, described herein, may allow one or more devices, such as one or more server devices implementing an information repository system, to provide results to timestamped queries (e.g., queries that request data as the data existed at a given time), even though the data within the information repository system may change continuously over time. Further, the information repository system, of one or more implementations, may be highly scalable, in that the information repository system may be implemented using multiple server devices that are each responsible for storing a portion of the information stored by the information repository system. Additionally, or alternatively, the information repository system, of some implementations, may be highly reliable, in that the information repository system may include multiple sets of server devices that each store at least a partial duplicate of information stored by the other sets of server devices.

The foregoing description provides illustration and description, but is not intended to be exhaustive or to limit the implementations to the precise form disclosed. Modifications and variations are possible in light of the above description or may be acquired from practice of the implementations. For example, while series of blocks have been described with regard to FIGS. 5-11, the order of the blocks may be modified in other implementations. Further, non-dependent blocks may be performed in parallel. Additionally, while example databases, tables, and data structures were described above, in practice, these databases, tables, and data structures may be implemented using any form or arrangement of data.

Furthermore, in one implementation, as described above, versioned database 110 and/or deterministic cache 115 may each be implemented using two or more server devices. In one implementation, when receiving a query, information repository system 207 may identify the multiple server devices that implement versioned database 110 and/or deterministic cache 115, and provide the query to the multiple server devices. Additionally, or alternatively, client 205 may identify the multiple server devices that implement versioned database 110 and/or deterministic cache 115, and client 205 may provide the query to the multiple server devices.

Further, in one implementation, information repository system 207 may search for results in deterministic cache 115 before searching for results in versioned database 110. In another implementation, information repository system 207 may concurrently search for results in deterministic cache 115 while searching for results in versioned database 110. In such an implementation, information repository system 207 may cease searching for results in versioned database 110 if a result is identified in deterministic cache 115.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   storing, by one or more server devices, a first version of information associated with a particular attribute associated with a particular item,
      storing the first version of the information including:
         storing a first value associated with the particular attribute, and
         storing a first timestamp associated with the first version of the information;
   receiving, by at least one of the one or more server devices, updated information associated with the particular attribute;
   storing, by at least one of the one or more server devices and based on the updated information, a second version of the information,
      storing the second version of the information including:
         storing a second value associated with the particular attribute, and
         storing a second timestamp associated with the second version of the information;
   receiving, by at least one of the one or more server devices, a query associated with the particular item,
      the query specifying a time;
   determining, by at least one of the one or more server devices and based on the time, whether the query is associated with the first version of the information or the second version of the information; and
   selectively outputting, by at least one of the one or more server devices, the first version of the information or the second version of the information,
      the first version of the information being output when the query is associated with the first version of the information, and
      the second version of the information being output when the query is associated with the second version of the information.

2. The method of claim 1, where the particular item is associated with at least one of:
   an advertising link, or
   an advertising event.

3. The method of claim 2, where the particular attribute is associated with at least one of:
   a location identifier associated with the advertising link,
   a cost per click associated with the advertising link,
   a cost per impression associated with the advertising link,
   anchor text associated with the advertising link,
   one or more annotations associated with the advertising link,
   an identifier of the advertising link,
   an identifier of the advertising event, or
   an address associated with a device associated with the advertising event.

4. The method of claim 1, where the query is a first query, the method further comprising:
   receiving a second query;
   identifying a type of result associated with the second query,
      where identifying the type of result includes:
         determining that the type of result is associated with immutable data that is expected to exist in one or more memory devices storing information associated with a plurality of items,
            the plurality of items including the particular item;
   searching the one or more memory devices for a result associated with the second query;
   outputting the result when the result is identified based on the searching; and
   subsequently repeating the searching for the result associated with the second query when the result is not identified based on the searching.

5. The method of claim 1, where the query is a first query, the method further comprising:
   receiving a second query;
   identifying a type of result associated with the second query,
      where identifying the type of result includes:
         determining that the type of result is associated with immutable data that is not expected to exist in one or more memory devices storing information associated with a plurality of items,
            the plurality of items including the particular item;
   searching the one or more memory devices for a result associated with the second query;

outputting the result when the result is identified based on the searching; and outputting an indication that the result was not found when the result is not identified based on the searching.

6. The method of claim 1, where the query is a first query and the time is a first time, the method further comprising:
receive a second query that specifies a second time;
identifying a type of result associated with the second query,
identifying the type of result comprising:
identifying that the type of result is associated with mutable data that is expected to exist in one or more memory devices storing information associated with a plurality of items,
the plurality of items including the particular item;
searching the one or more memory devices for a result associated with the second query;
outputting, based on the second time specified by the second query and when the result is identified based on the second query, a version of the identified result that is associated with the second query; and
subsequently repeating the searching for the result associated with the second query when the result is not identified based on the searching.

7. The method of claim 1, where the query is a first query and the time is a first time, the method further comprising:
receiving a second query that specifies a second time;
identifying a type of result associated with the second query,
where identifying the type of result includes:
determining that the type of result is associated with mutable data that is not expected to exist in one or more memory devices storing information associated with a plurality of items,
the plurality of items including the particular item;
searching the one or more memory devices for a result associated with the second query;
outputting, based on the second time specified by the second query and when the result is identified based on the second query, a version of the identified result that is associated with the second query; and
outputting an indication that the result was not found when the result is not identified based on the searching.

8. A device, comprising:
one or more memory devices to store:
a first version of a particular attribute associated with a particular item of a plurality of items stored in the one or more memory devices,
the first version of the particular attribute including:
a first value associated with the particular attribute, and
a first timestamp associated with the first version; and
one or more processors to:
receive an update to the particular attribute;
store a second version of the particular attribute based on the update,
when storing the second version, the one or more processors are to:
store a second value associated with the update to the particular attribute, and
store a second timestamp associated with the update to the particular attribute;
receive a query, associated with the particular item, that specifies a time;
determine, based on the time, that the first version of the particular attribute is associated with the query;

output the first version of the particular attribute based on the first version of the particular attribute being associated with the query.

9. The device of claim 8, where the particular item is associated with at least one of:
an advertising link, or
an advertising event.

10. The device of claim 9, where the particular attribute is associated with at least one of:
a location identifier associated with the advertising link,
a cost per click associated with the advertising link,
a cost per impression associated with the advertising link,
anchor text associated with the advertising link,
one or more annotations associated with the advertising link,
an identifier of the advertising link,
an identifier of the advertising event, or
an address associated with a device associated with the advertising event.

11. The device of claim 8, where the query is a first query, where the one or more processors are further to:
receive a second query;
identify a type of result associated with the second query,
when identifying the type of result, the one or more processors are to:
identify that the type of result is associated with immutable data that is expected to exist in the one or more memory devices;
search the one or more memory devices for a result associated with the second query;
output the result when the result is identified based on the searching; and
subsequently repeat the searching for the result associated with the second query when the result is not identified based on the searching.

12. The device of claim 8, where the query is a first query, where the one or more processors are further to:
receive a second query;
identify a type of result associated with the second query,
where when identifying the type of result, the one or more processors are further to:
identify that the type of result is associated with immutable data that is not expected to exist in the one or more memory devices;
search the one or more memory devices for a result associated with the second query;
output the result when the result is identified based on the searching; and
output an indication that the result was not found when the result is not identified based on the searching.

13. The device of claim 8, where the query is a first query, where the one or more processors are further to:
receive a second query;
identify a type of result associated with the second query,
where when identifying the type of result, the one or more processors are to:
identify that the type of result is associated with mutable data that is expected to exist in the one or more memory devices;
search the one or more memory devices for a result associated with the second query;
output, based on the time specified by the second query and when the result is identified based on the second query, a version of the identified result that is associated with the received query; and subsequently repeat the searching for the result associated with the second query when the result is not identified based on the searching.

14. The device of claim 8, where the query is a first query, where the one or more processors are further to:
   receive a second query;
   identify a type of result associated with the second query, where when identifying the type of result, the one or more processors are further to:
      identify that the type of result is associated with mutable data that is not expected to exist in the one or more memory devices;
   search the one or more memory devices for a result associated with the second query;
   output, based on the time specified by the second query and when the result is identified based on the second query, a version of the identified result that is associated with the received query; and
   output an indication that the result was not found when the result is not identified based on the searching.

15. A non-transitory computer-readable medium storing instructions, the instructions comprising:
   one or more instructions which, when executed by one or more processors, cause the one or more processors to:
      store a first version of information associated with a particular attribute associated with a particular item in a memory,
         the first version of the information associated with the particular attribute comprising:
            a first value associated with the particular attribute, and
            a first timestamp associated with the first version;
      receive an update to the information associated with the particular attribute,
      store, based on the update to the particular attribute, a second version of the information associated with the particular attribute,
         the second version of the particular attribute including:
            a second value associated with the update to the particular attribute, and
            a second timestamp associated with the update to the particular attribute;
      receive a query, associated with the particular item, that specifies a time;
      determine, based on the time, that the first version of the information associated with the particular attribute is associated with the query; and
      output the first version of the information associated with the particular attribute based on the first version of the information associated with the particular attribute being associated with the query.

16. The non-transitory computer-readable medium of claim 15, where the particular item is associated with at least one of:
   an advertising link, or
   an advertising event.

17. The non-transitory computer-readable medium of claim 16, where the particular attribute is associated with at least one of:
   a location identifier associated with the advertising link,
   a cost per click associated with the advertising link,
   a cost per impression associated with the advertising link,
   anchor text associated with the advertising link,
   one or more annotations associated with the advertising link,
   an identifier of the advertising link,
   an identifier of the advertising event, or
   an address associated with the advertising event.

18. The non-transitory computer-readable medium of claim 15, where the instructions further comprise:
   one or more instructions which, when executed by the one or more processors, cause the one or more processors to:
      receive a second query;
      identify a type of result associated with the second query,
         where the one or more instructions to identify the type of result, include:
            one or more instructions which, when executed by the one or more processors, cause the one or more processors to:
               identify that the type of result is associated with immutable data that is expected to exist in the memory;
      search the memory for a result associated with the second query;
      output the result when the result is identified based on the searching; and
      subsequently repeat the searching for the result associated with the second query when the result is not identified based on the searching.

19. The non-transitory computer-readable medium of claim 15, where the query is a first query, where the instructions further comprise:
   one or more instructions which, when executed by the one or more processors, cause the one or more processors to:
      receive a second query;
      identify a type of result associated with the second query,
         where the one or more instructions to identify the type of result include:
            one or more instructions which, when executed by the one or more processors, cause the one or more processors to identify that the type of result is associated with immutable data that is not expected to exist in the memory;
      search the memory for a result associated with the second query;
      output the result when the result is identified based on the searching; and
      output an indication that the result was not found when the result is not identified based on the searching.

20. The non-transitory computer-readable medium of claim 15, where the query is a first query, where the instructions further comprise:
   one or more instructions which, when executed by the one or more processors, cause the one or more processors to:
      receive a second query;
      identify a type of result associated with the second query,
         where the one or more instructions to identify the type of result include:
            one or more instructions which, when executed by the one or more processors, cause the one or more processors to:
               identify that the type of result is associated with mutable data that is expected to exist in the memory;
      search the memory for a result associated with the second query;
      output, based on a time specified by the second query and when the result is identified based on the second query, a version of the identified result that is associated with the second query; and subsequently repeat the searching for the result associated with the second query when the result is not identified based on the searching.

21. The non-transitory computer-readable medium of claim 15, where the query is a first query, and where the instructions further comprise:
one or more instructions which, when executed by the one or more processors, cause the one or more processors to:
receive a second query;
identify a type of result associated with the second query,
where the one or more instructions to identify the type of result include:
one or more instructions which, when executed by the one or more processors, cause the one or more processors to:
identify that the type of result is associated with mutable data that is not expected to exist in the memory;
search the memory for a result associated with the second query;
output, based on a time specified by the second query and when the result is identified based on the second query, a version of the identified result that is associated with the second query; and
output an indication that the result was not found when the result is not identified based on the searching.

22. The method of claim 1, where the query is a first query and the time is a first time, the method further comprising:
receiving a second query that includes information identifying a second time;
determining that the second query is associated with the particular item;
determining whether the second time is associated with the first timestamp or the second timestamp; and
selectively providing one of the first value or the second value,
the first value being provided when the second time is associated with the first timestamp, and
the second value being provided when the second time is associated with the second timestamp.

23. The device of claim 8, where the query is a first query and the time is a first time, and
where the one or more processors are further to:
receive a second query that includes information identifying a second time;
determine that the second query is associated with the particular item;
determine whether the second time is associated with the first timestamp or the second timestamp; and
selectively provide one of the first value or the second value,
the first value being provided when the second time is associated with the first timestamp, and
the second value being provided when the second time is associated with the second timestamp.

24. The non-transitory computer-readable medium of claim 15, where the query is a first query and the time is a first time, and where the instructions further comprise:
one or more instructions which, when executed by the one or more processors, cause the one or more processors to:
receive a second query that includes information identifying a second time;
determine that the second query is associated with the particular item;
determine whether the second time is associated with the first timestamp or the second timestamp; and
selectively provide one of the first value or the second value,
the first value being provided when the second time is associated with the first timestamp, and
the second value being provided when the second time is associated with the second timestamp.

* * * * *